June 24, 1969 R. L. GAMBLIN ET AL 3,452,213

MICROWAVE LOGIC CIRCUIT

Filed Oct. 22, 1965

INVENTORS
RODGER L. GAMBLIN
PHILIP A. LORD
MITCHELL P. MARCUS
CYRIL J. TUNIS

BY Ronald J. Clark

ATTORNEY

United States Patent Office 3,452,213
Patented June 24, 1969

3,452,213
MICROWAVE LOGIC CIRCUIT

Rodger L. Gamblin and Philip A. Lord, Vestal, and Mitchell P. Marcus, Binghamton, and Cyril J. Tunis, Endwell, N.Y., assignors to International Business Machines Corporation, Armonk, N.Y., a corporation of New York Filed Oct. 22, 1965, Ser. No. 502,006
Int. Cl. H03k 19/02
U.S. Cl. 307—88 5 Claims

ABSTRACT OF THE DISCLOSURE

A universal microwave logic block of microwave absorption elements for the performance of logical operations on a plurality of input variables. The various logical combinations are represented by parallel branches of series connected microwave absorption elements. One or more of the parallel branches are selected by an additional microwave absorption element in series with each branch. Output signals from the selected branches are applied to a sense amplifier to generate a signal representing the desired logical combination of input variables.

Figure 1:
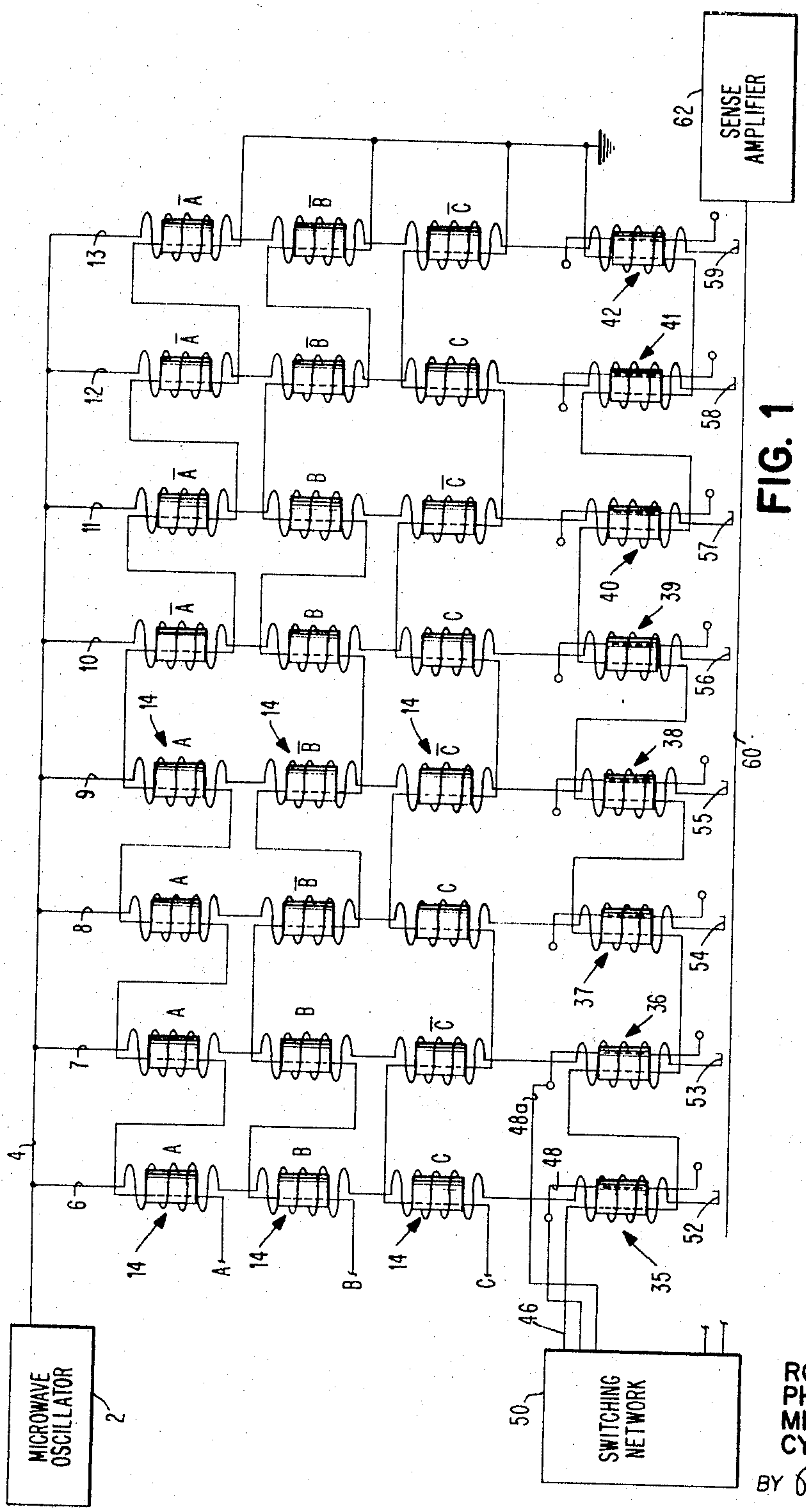

This invention relates to logic circuits and, more particularly, to a universal microwave absorption logic circuit which is able to perform all the logical functions associated with its input variables.

The need for a universal logic block has been felt for some time and USP 3,028,088 shows an early attempt to provide such a universal logic block. In comparison, the present invention contains fewer circuit elements and responds much faster to its input variables. Each of the input logical variables is represented by a magnetic state of a ferrite element. Groups of these ferrite elements are arranged to represent the various AND functions of the input variables. An additional ferrite switch is supplied to each group as a means of combining the various groups into logical functions. The determination of what logical function is present is made by a single sense amplifier connected to the contributing groups by a portion of the ferrite switches. The speed of response is limited to the transmission time of a microwave signal over a helix wound around each ferrite element and the time required to change the state of the ferrite elements in the groups forming the AND function. The universal logic block built according to the principles of the instant invention can be connected to other similar logic blocks to build a digital information handling machine manipulating the digital information according to the logic dictated by the universal logic blocks.

It is an object of the instant invention to provide an improved logic device having increased operating speed.

It is a further object of the instant invention to provide a universal logic circuit suitable for employment as a basic logic block for larger logic circuits.

It is a still further object of the instant invention to provide a universal logic block having N input variables by employing $2^N$ branch lines for generating the AND condition for all variable combinations and having an added switch element in each branch to provide the remaining logical functions by selective combination of the branch lines.

It is another object of the instant invention to provide a universal logic block employing passive microwave devices to generate logical functions.

It is a further object of the instant invention to provide a universal logic block employing microwave signals to sample a plurality of input variables and to combine these variables into all possible logical functions.

These and other objects of the instant invention are achieved through the employment of a plurality of microwave absorption elements completely described by R. L. Gamblin in his co-pending application entitled Computer Logic System, S.N. 500,973, and assigned to the assignee of the present invention. Each of these elements is permanently wound to represent a particular logical function. Certain of the microwave absorption elements are connected in series and arranged in branched relationship with a single source of microwave signals. Each branch represents a particular combination of the input variable and all branches may be taken in combination to represent all possible logic functions of a certain number of input variables. In each branch line, an additional microwave absorption element is positioned so as to permit or prevent the logical answer of that particular branch from being transmitted to a sense amplifier common to all branches. More importantly, this switch element is constructed so that it can be selectively altered by signals originating external to the logic block. After the basic logic block has been assembled to perform a required functional output, the functional output can be changed by signals external to the basic logic block and in this manner the entire structure can then assume a different functional appearance.

Figure 2:
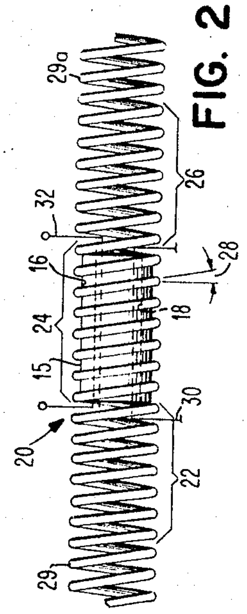

The foregoing and other objects, features and advantages of the invention will be apparent from the following more particular description of preferred embodiments of the invention, as illustrated in the acompanying drawings, wherein FIG. 1 is a schematic view of a logic block satisfying all the possible Boolean functions of three separate inputs; and FIG. 2 shows the details of a single ferrite element employed in FIG. 1.

Referring to FIG. 1, there can be seen a Gunn Effect or tunnel diode oscillator 2 or other source of microwave signals. A complete description of a suitable Gunn Effect oscillator is given in U. S. Patent 3,365,583 assigned to the assignee of the present invention. A strip line 4 transmits microwave energy from the oscillator 2 to a plurality of branch lines 6 through 13 respectively. Uniform energy distribution is made to each of the branches by tapering the strip line 4 and by providing impedance mismatches at each of the junctions of each branch with the strip line. In each of the branches 6 through 13 there are a plurality of microwave absorption devices 14. The devices are schematically arranged in columns and rows wherein the columns are shown extending perpendicular to the strip line 4 and the rows are shown extending parallel to the line 4. The columns are shown associated with the branch lines 6 through 13 and the rows are shown associated with a plurality of input lines A, B and C. In the best mode of operation, the rows and columns should be in straight lines since the microwave signal is best managed in this configuration. Certainly, the rows and columns need not be at right angles to each other.

Referring briefly to FIG. 2, there can be seen a detailed diagram of the microwave absorption element 14 employed in the instant invention comprising a cylindrically shaped ferrite toroid 15 having an outer surface 16 and an inner wall 18. The term ferrite is used to refer to that class of magnetic metals that possess extremely high resistivity and tensor permeability. The term toroid refers to that class of geometric shapes having an inner wall 18 forming a bore to provide an air gap sufficient to prevent linear polarization and to assure azimuthal polarization when subject to a magnetizing current. A helical coil 20 is wound around the toroid 15 and is divided into an input impedance matching section 22, a gyromagnetic resonant absorption section 24 and an output impedance matching section 26. The coil 20 is formed with a plurality of turns uniformly spaced at 20-mil intervals and wound with a pitch angle 28 of approximately 0.1 radian. The length of each section 22, 24 and 26 equals an integral number of wavelengths of the frequency generated by the oscillator 2. The core shown has an outside diameter of 60 mils and an inside diameter of 40 mils. Portions of the next adjacent matching sections 29 and 29*a* are also shown.

Connections between succeeding elements are made by connecting the ends of adjacent coil 20 in a manner to provide a continuous pitch angle. Alternatively as shown in FIG. 2, the coil is continuously wound and the elements 14 are uniformly spaced at the required wavelength intervals within the coil. An embodiment employing a continuous coil can be constructed by plating the coils on a form carrying the requisite number of ferrite toroids. A single drive wire 30 carries a switching current to drive the ferrite toroid into either stable state of remnant magnetization. A cumulative switching effect, well known in the prior art, can be obtained by threading the toroid with a plurality of drive wires 30 and 32, each carrying a portion of the switching current required to switch the magnetic state of the toroid.

A brief explanation of the gyromagnetic frequency absorption phenomenon exhibited by the element shown in FIG. 2 is given herein as a means of better understanding the instant invention. A cylindrically shaped ferrite toroid is magnetized permanently or temporarily by a current pulse on a drive line threading its central bore. In the magnetized ferrite, one electron now finds itself in the field of all the other electrons. The one electron is not free to move alone in response to an external magnetic field but rather, each of its similarly situated, or coupled electrons respond to the external magnetic field together because of exchange interactions. Because an electron has both a magnetic moment and angular momentum, it acts like a small magnetized top when exposed to an external magnetic field. When the electron is in this external magnetic field, the field attempts to rotate the electron so that the two become aligned. Like all tops upon which such forces act, however, the electron does not line up with the field but instead, precesses or swings about the field direction. With a magnetic field that is rotating in the same sense as the electron precesses, the electron absorbs energy from the field and becomes disaligned therefrom. In a ferromagnetic material, because of the exchange interactions tying one electron to another, the rotating magnetic field cannot disalign electrons to any great extent but is instead absorbed by the system of electrons. The magnetic field must also rotate at substantially the same frequency as the electrons. This frequency is the gyromagnetic resonant frequency. The transfer of energy to the electrons in the ferrite from the magnetic field is called gyromagnetic resonant absorption. When the magnetic field is either rotating at a substantially different frequency or in the opposite sense, the current generating the external magnetic field passes over the ferrite substantially undiminished.

Referring to FIG. 1, if there are N number of Boolean input variables, then there are N number of devices 14 in each branch line. The number of branch lines connected to the strip line 4 would be in the most general case $2^N$, the total number of AND functions possible from the number of input variables. Therefore, for a three-variable function, as shown in the figure, there would be eight branch lines and each branch would have three microwave absorption elements 14. For a greater number of input Boolean variables, there would be a corresponding increase in the number of branch lines and the number of microwave absorption elements 14 in each branch. Additional absorption switches 35 through 42 are connected in series in each of the branches 6 through 13, respectively to select the particular logical function which is desired. Each of the switches 35 through 42 is basically the same as the elements 14 with the addition of a partial switching network 44 having standard half-select wires 46 and 48. The wire 46 may thread all the elements in the group while the additional wire 48 is separate and distinct for each switch. More specifically, the proper half-select switching current on the lines 46 and 48 switches the element 35, and the proper half-select switching current on the line 46 and a line 48*a* switches the element 36. Each of the wires 46, 48 are connected to switching network 50. Each of the select wires threading the function select switches 35 through 42 carry a partial switching current. For example, since two lines are shown, each line carries a half-select current. According to standard principles the ferrite switch at the junction of the half-select pulses is switched to either of its stable remnant states of magnetization depending on the polarity of the pulses.

According to the phenomenon taught above, a function select switch 35 absorbs or transmits microwave energy therethrough according to which remnant state of magnetization it presently represents. The half-select wires 46 and 48 are connected to the network 50, whereby certain of the switches can be caused to change their state thereby passing or absorbing energy according to instructions received from the network. In this manner, the universal logic block generates an output depending upon the state of these half-select lines 46 and 48 and the plurality of the variable inputs A, B and C. Each of the switches 35 through 42 are supplied with a directional coupler 52 through 59 respectively. In this manner, energy transmitted through any one of the branches is coupled by a strip line 60 to a sense amplifier and driver circuit 62. The output of this driver circuit 62 can change, for example, the output of the switching network by its use as an input to the network, or can be used as the functional input A, B, C for an additional universal logic block.

In operation as a universal logic block, the selective manipulation of the switches 35 through 42 determine which logical function satisfies the capabilities of the block. For example, when the switch 35 is in its transmission state and the switches 36 through 42 are in their absorption state, the block satisfies the logical function expressed as ABC. Microwave energy from the oscillator 2 travels down the helices 20 associated with the three elements in the branch line 6 when all elements 14 in the branch 6 are in their transmission state.

The function of the branch lines can be learned by an inspection of the direction in which a plurality of function lines A, B and C are threaded through the respective elements 14. The convention adapted in FIG. 1, is that the threading of the drive wire from the bottom of the element to the top produces the function A wherein transmission of microwave occurs. The threading of the drive wire from the top to the bottom produces the function $\overline{A}$ wherein absorption of the microwaves occur. The function of each element is represented by the symbol placed adjacent thereto.

The circuit shown in FIG. 1 can have two modes of operation depending on the type of ferrite employed to construct the toroids 15. When the ferrite is magnetically soft, the ferrite only absorbs microwaves on its associated helix 20 for a substantially short period after the variable input is removed from the lines A, B and C. When the ferrite is magnetically hard, a stable remnant state persists after the removal of the variable input and each toroid 15 acts like a magnetic memory core.

In the first mode of operation, the absence of a variable input signal A, B or C renders its corresponding core in each branch line transparent to the microwave signal traveling down its corresponding helix. However, in the second mode of operation, the elements 14 associated with the missing variable input or inputs remain in the stable state caused by the last variable input switching pulse. The most satisfactory combination requires magnetically soft element 14 and magnetically hard switches 35 through 42.

It is not deemed necessary for a complete description of the invention to set out the conditions by which all two hundred and fifty-six functions are accomplished. A few are set out as illustration.

The function AB is accomplished by having switches 35 and 36 in the transmission state and switches 37 through 42 in the absorption state. Regardless of the nature of the third variable C, whether it be C or $\overline{C}$, an output will reach the sense amplifier 62.

The function $AB+\overline{A}C$ is accomplished by having switches 35 and 36, and 39 and 41 in the transmission state and the remaining switches in the absorption state. One skilled in the art can easily supply the conditions to accomplish the remaining functions.

While the invention has been particularly shown and described with reference to preferred embodiments thereof, it will be understood by those skilled in the art that various changes in form and details may be made therein without departing from the spirit and scope of the invention.

What is claimed is:

1. A universal microwave absorption logic circuit comprising, a source of microwaves, a plurality of toroidal magnetic microwave absorption elements responsive to said source and arranged in rows and columns, each of said elements having a coil associated therewith, each of said columns of elements having their respective coils electrically connected in series with said source to provide a plurality of column circuits electrically connected in parallel with each other, a plurality of input lines each threaded through preselected combinations of said elements in each row in a direction to set said elements to a magnetic state allowing microwave transmission through said coils and threaded through the remaining elements in each row in a direction to set said remaining elements to a magnetic state allowing microwave absorption by said absorption elements and each such input line conveying a drive signal representing a binary logical variable, the respective input lines being threaded through the respective rows of elements in a polarized sense to create magnetic states in said elements to provide the logical AND functions corresponding to each combination of the variable logic signals on the input lines, switching network means for generating a plurality of function output select signals, a plurality of magnetic switches each electrically connected in series with the series connected coils in each column and responsive to said function select output signals, said switches being selectively driven to a microwave transmission state and to a universal absorption state, and means for summing the outputs of said switches.

2. A universal microwave absorption logic circuit comprising, a source of microwaves, a plurality of toroidal magnetic microwave absorption elements responsive to said source and arranged in rows and columns, each of said elements having a coil associated therewith, each of said columns of elements having their respective coils electrically connected in series with said source to provide a plurality of column circuits electrically connected in parallel with each other, a plurality of input lines each threaded through preselected combinations of said elements in each row in a direction to set said elements to a magnetic state allowing microwave transmission through said coils and threaded through the remaining elements in each row in a direction to set said remaining elements to a magnetic state allowing microwave absorption by said absorption elements and each such input line conveying a drive signal representing a Boolean variable, the setting of the elements in each column being representative of a single Boolean AND function of one of the possible Boolean functions, said columns taken collectively being representative of all the possible Boolean AND functions of the Boolean variables, switching network means operating in response to a stored program for generating a plurality of function output select signals, a plurality of magnetic switches electrically connected in series with the series connected coils in each column and responsive to said function output select signals for being selectively driven to a microwave transmission state and to a microwave absorption state, and means for summing the outputs of said switches.

3. A universal microwave absorption logic circuit as recited in claim 2 and further including means for equally dividing the output of said microwave source among said columns of microwave absorption elements.

4. A universal microwave absorption logic circuit as recited in claim 2 wherein each of said microwave absorption elements and said magnetic switches comprise, a cylindrically shaped ferrite toroid having an outer wall and a central bore, and a helical coil wound around said toroid.

5. A universal microwave absorption logic circuit as recited in claim 4 wherein each of said elements comprises a magnetically soft ferrite and each of said switches comprises a magnetically hard ferrite.

References Cited

UNITED STATES PATENTS

| | | | |
|---|---|---|---|
| 2,911,554 | 11/1959 | Kompfner et al. | 333—24 XR |
| 3,248,556 | 4/1966 | Hartman | 307—88 |

OTHER REFERENCES

Kriz, T. A.: Microwave Readout of Ferrite Memory Storage, IEEE Transaction on Electronic Computers, February 1965, pp. 75–76.

BERNARD KONICK, *Primary Examiner.*

GARY M. HOFFMAN, *Assistant Examiner.*

U.S. Cl. X.R.

340—173, 174